US008097852B2

(12) United States Patent
Yao

(10) Patent No.: US 8,097,852 B2
(45) Date of Patent: Jan. 17, 2012

(54) MULTIPLE TRANSFER MOLDED OPTICAL PROXIMITY SENSOR AND CORRESPONDING METHOD

(75) Inventor: Yufeng Michael G. Kelley Yao, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 145 days.

(21) Appl. No.: 12/557,504

(22) Filed: Sep. 10, 2009

(65) Prior Publication Data

US 2011/0057102 A1   Mar. 10, 2011

(51) Int. Cl.
*G01J 5/02* (2006.01)
(52) U.S. Cl. .................. 250/339.01; 250/338.1; 29/832
(58) Field of Classification Search ............... 250/338.1, 250/339.01; 29/832
See application file for complete search history.

(56) References Cited

U.S. PATENT DOCUMENTS

| 5,155,777 | A | 10/1992 | Angelopoulos et al. |
| 5,675,143 | A | 10/1997 | Heimlicher |
| 6,064,062 | A | 5/2000 | Bohn |
| 7,026,710 | B2 | 4/2006 | Coyle et al. |
| 7,109,465 | B2 | 9/2006 | Kok et al. |
| 7,510,888 | B2 | 3/2009 | Guenther et al. |
| 7,514,666 | B2 | 4/2009 | Yee et al. |
| 7,582,513 | B2* | 9/2009 | Kroeninger et al. ........... 438/114 |
| 2006/0016994 | A1* | 1/2006 | Basoor et al. ............. 250/338.1 |
| 2008/0011940 | A1 | 1/2008 | Zhang et al. |
| 2008/0118241 | A1 | 5/2008 | TeKolste et al. |
| 2008/0197376 | A1 | 8/2008 | Bert et al. |
| 2008/0296478 | A1 | 12/2008 | Hernoult |
| 2008/0308917 | A1 | 12/2008 | Pressel et al. |
| 2009/0027652 | A1 | 1/2009 | Chang et al. |
| 2009/0159900 | A1 | 6/2009 | Basoor |
| 2009/0267173 | A1* | 10/2009 | Takahashi et al. ............ 257/434 |
| 2010/0327164 | A1* | 12/2010 | Costello et al. ............ 250/338.1 |
| 2011/0057104 | A1 | 3/2011 | Yao et al. |

FOREIGN PATENT DOCUMENTS

WO  WO 2009/072786  6/2009

OTHER PUBLICATIONS

AZ Optics, "Device Debuts as the World's Best-Performing Integrated Light/Proximity Sensor", Nov. 11, 2008.

(Continued)

*Primary Examiner* — David Porta
*Assistant Examiner* — Hugh H Maupin

(57) ABSTRACT

Various embodiments of a multiple-stage-molded optical proximity sensor and method of making same are disclosed. According to one embodiment, the method comprises mounting an infrared light emitter atop a first portion of a substrate, and mounting an infrared light detector, an ambient light detector and an integrated circuit atop a second portion of the substrate. In a first molding step, an infrared light pass component is molded over the substrate and the infrared light emitter, the infrared light detector, the ambient light detector, and the integrated circuit. The infrared light pass component is then cured, followed by forming a slot in the cured infrared light pass component between the first and second portions of the substrate. In a second molding step, an infrared light cut component is molded over the slot, the integrated circuit, the ambient light detector, and over portions of the infrared light emitter and the infrared light detector.

32 Claims, 8 Drawing Sheets

OTHER PUBLICATIONS

Ishihara, et al., "A Dual Face Package Using a Post with Wire Components: Novel Structure for PoP Wafer Level CSP and Compact Image Sensor Package", *Electronic Components and Technology Conference* 2008, 1093-1098.

Khamal, Ibrahim, "Infra-Red Proiximilty Sensor (II)", Apr. 4, 2008.

Avago Technologies, "Integrated Ambient Light and Proximity Sensor Prelim Datasheet", *APDS-9800* Mar. 2, 2009.

Avago Technologies, "Integrated Optical Proximity Sensors Prelim Datasheet", *APDS-9120* Feb. 25, 2009.

Nitto Denko Corporation, "Technical Data Sheet", *NT-8506* 2001.

Nitto Denko Corporation, "Technical Data Sheet", *NT-MB-IRL3801* 2008.

Penchem Technologies Data Sheet, "PENCHEM OP 580", *IR Filter Optoelectronic Epoxy* Apr. 2009.

Penchem Technologies Data Sheet, "PENCHEM OP 579", *IR Pass Optoelectronic Epoxy* Apr. 2009.

Penchem Technologies Data Sheet for PENCHEM OP 580—IR Filter Optoelectronic Epoxy, Apr. 2009.

Penchem Technologies Data Sheet for PENCHEM OP 579—IR Pass Optoelectronic Epoxy, Apr. 2009.

Technical Data Sheet, Nitto Denko Corporation. NT-MB-IRL3B01, 2008.

Technical Data Sheet, Nitto Denko Corporation, NT-8506, 2001.

Avago Technologies APDS-9120 Integrated Optical Proximity Sensors Prelim Datasheet, Feb. 25, 2009.

Avago Technologies APDS-9800 Integrated Ambient Light and Proximity Sensor Prelim Datasheet, Mar. 2, 2009.

Avago Technologies APDS-9700 Signet Conditioning IC for Optical Proximity Sensors, Jan. 4, 2008.

Avago Technologies APDS-900S Miniature Surface-Mount Ambient Light Photo Sensor, Jan.164, 2007.

Data Sheet for TYTEK AIGaAs/GaAs Infrared Chip—TK116IRA, Nov. 2006.

Data Sheet for TYTEK A/GaAs/GaAs Infrared Chip—TK116IRA, Nov. 2006.

\* cited by examiner

MULTIPLE TRANSFER MOLDED OPTICAL PROXIMITY SENSOR AND CORRESPONDING METHOD

FIELD OF THE INVENTION

Various embodiments of the inventions described herein relate to the field of proximity sensors, and components, devices, systems and methods associated therewith.

BACKGROUND

Optical proximity sensors, such as the AVAGO TECHNOLOGIEST™ HSDL-9100 surface-mount proximity sensor, the AVAGO TECHNOLOGIES™ APDS-9101 integrated reflective sensor, the AVAGO TECHNOLOGIES™ APDS-9120 integrated optical proximity sensor, and the AVAGO TECHNOLOGIES™ APDS-9800 integrated ambient light and proximity sensor, are known in the art. Such sensors typically comprise an integrated high efficiency infrared emitter or light source and a corresponding photodiode or light detector, and are employed in a large number of handheld electronic devices such as mobile phones, Personal Data Assistants ("PDAs"), laptop and portable computers, portable and handheld devices, amusement and vending machines, industrial automation machinery and equipment, contactless switches, sanitary automation machinery and equipment, and the like.

Referring to FIG. 1, there is shown a prior art optical proximity sensor 10 comprising infrared light emitter 16, light emitter driving circuit 51, light detector or photodiode 12, light detector sensing circuit 53, metal housing or shield 18 with apertures 52 and 54, and object to be sensed 60. Light rays 15 emitted by emitter 16 and reflected as light rays 19 from object 60 (which is in relatively close proximity to optical proximity sensor 10) are detected by photodiode 12 and thereby provide an indication that object 60 is close or near to sensor 10.

As further shown in FIG. 1, optical proximity sensor 10 further comprises metal housing or shield 18 formed of metal and comprising apertures 52 and 54 located over light emitter 16 and light detector 12, respectively, such that at least a first portion of light 15 emitted by light detector 12 passes through aperture 55, and at least a second portion of the first portion 19 of light reflected from object 50 in proximity to sensor 10 passes through aperture 57 for detection by light detector 12. As shown, metal housing or shield 18 may further comprise first and second modules 61 and 63 within which light emitter 16 and light detector 12 are disposed, respectively. The first and second modules 61 and 63 comprise adjoining optically opaque metal inner sidewalls 25 to provide optical isolation between first and second modules 61 and 63.

Many optical proximity sensors generally include a metal shield, such as shield or housing 18 of the type shown in FIG. 1, to provide optical isolation between light emitter 16 and light detector or photodiode 12 so that undesired optical cross-talk between emitter 16 and detector 12 is minimized. See, for example, the Data Sheets corresponding to the AVAGO TECHNOLOGIES™ APDS-9120 Integrated Optical Sensors Preliminary Datasheet and the AVAGO TECHNOLOGIES™ APDS-9800 Integrated Ambient Light and Proximity Sensors Preliminary Datasheet, each of which is hereby incorporated by reference herein, each in its respective entirety.

FIG. 2 shows a prior art optical proximity sensor 10 with metal shield or housing 18. The optical proximity sensor shown in FIG. 2 is an AVAGO TECHNOLOGIES™ APDS-9120 Integrated Optical Proximity Sensor, which contains a molded plastic substrate 11 upon which are mounted LED 16 and light detector or photodiode 12. Single-piece metal shield 18 covers LED 16 and light detector or photodiode 12 and contains a downwardly projecting light barrier 65 disposed therebetween (not shown in FIG. 2). Electrical contacts 17 provide a means to establish electrical connections between proximity sensor 10 and external devices. In the APDS-9120 optical proximity sensor, metal shield 18 is formed and thinned using conventional metal stamping techniques, and is affixed to the underlying plastic substrate 11 by gluing. The APDS-9120 sensor has an areal footprint of only 4 mm by 4 mm, and thus is quite small.

FIG. 3 shows a prior art optical proximity sensor 10 with a more complicated metal shield or housing 18 than that of FIG. 2. The optical proximity sensor shown in FIG. 3 is an AVAGO TECHNOLOGIES™ APDS-9800 Integrated Ambient Light and Proximity Sensor, which contains a printed circuit board ("PCB") substrate 11 upon which are mounted LED 16, light detector or photodiode 12, and ambient light sensor 14. The two-piece metal shield 18 covers LED 16, light detector or photodiode 12, and ambient light sensor 14 and contains a downwardly projecting light barrier 65 disposed therebetween. In the APDS-9800 optical proximity sensor, metal shield 18, being of a considerably more complicated shape and geometry than that of FIG. 2, is formed and thinned using more advanced progressive metal stamping techniques, and must be hand-fitted and attached to the underlying PCB by gluing to ensure proper alignment and fit.

As will now be seen, at least some optical proximity sensors of the prior art rely upon the use of an externally mounted metal shield 18, which is required to reduce the amount of crosstalk or interference that might otherwise occur between LED 16 and light detector 12, as well as to help increase the detection distance of the device. Metal shields 18 are quite small, however, making them difficult to manufacture in high volumes, and thus expensive to fabricate. Such metal shields 18 also generally require expensive automated equipment to attach same to sensors 10 in a mass production setting. Moreover, the quality of metal shields 18 often varies, and issues commonly arise with suppliers being unable to meet the tight dimensional tolerances required for such small devices. Metal shields 18 can also detach from sensor 10, thereby adding another failure point for sensor 10.

In addition, the commercial marketplace demands ever smaller portable electronic devices. This of course means there exists a motivation to make optical proximity sensors ever smaller. As optical proximity sensors become smaller, it becomes increasingly difficult to manufacture and attach the aforementioned metal shields to the sensors in a mass production setting. The metal shields themselves also add to the bulk and volume of the resulting sensor or package.

What is need is an optical proximity sensor design that eliminates the need to include a metal shield 18, but which retains high crosstalk and interference rejection characteristics so that an optical proximity sensor can be provided that features improved performance, lower cost, increased manufacturability and improved reliability. What is also needed is a smaller optical proximity sensor.

SUMMARY

In some embodiments, there is provided a method of making an optical proximity sensor comprising mounting an infrared light emitter atop a first portion of a substrate, mounting an infrared light detector, an ambient light detector, and an integrated circuit atop a second portion of the substrate, in a first molding step, molding an infrared light pass component over the infrared light emitter, the infrared light detector, the ambient light detector, the integrated circuit, and portions of the substrate, curing the infrared light pass component, forming a slot in the cured infrared light pass component between the first and second portions of the substrate, and in a second molding step, molding an infrared light cut component over the slot and the integrated circuit, and over portions of the infrared light emitter, the ambient light detector, and the infrared light detector such that first, second and third apertures are formed over the infrared light emitter, the ambient light detector, and the infrared light detector, respectively.

In other embodiments, there is provided an optical proximity sensor comprising an infrared light emitter mounted atop a first portion of a substrate, an infrared light detector, an ambient light detector, and an integrated circuit mounted atop a second portion of the substrate, an infrared light pass component molded over the infrared light emitter, the infrared light detector, the ambient light detector, the integrated circuit, and at least portions of the substrate, a slot disposed between the first and second portions of the substrate, and an infrared light cut component molded over the slot and the integrated circuit, and over portions of the infrared light emitter, the ambient light detector, and the infrared light detector such that first, second and third apertures are formed over the infrared light emitter, the ambient light detector, and the infrared light detector, respectively.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

Figure 1:
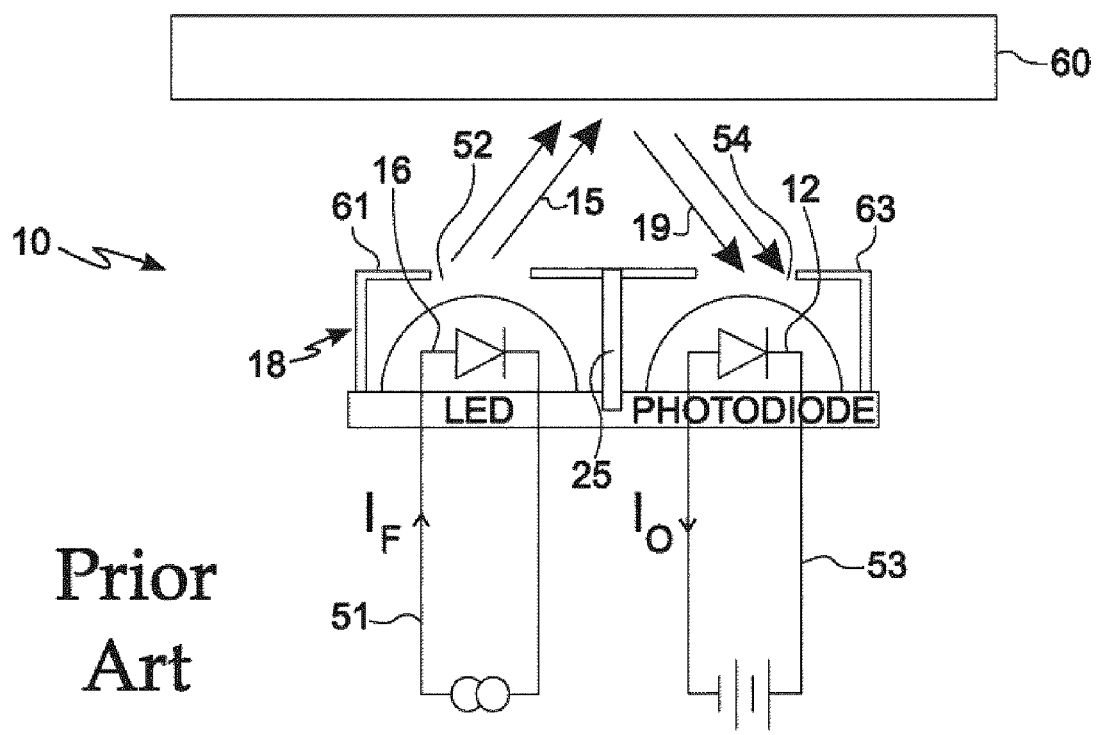
FIG. 1 shows a prior art optical proximity sensor and associated circuitry.
Figure 2:
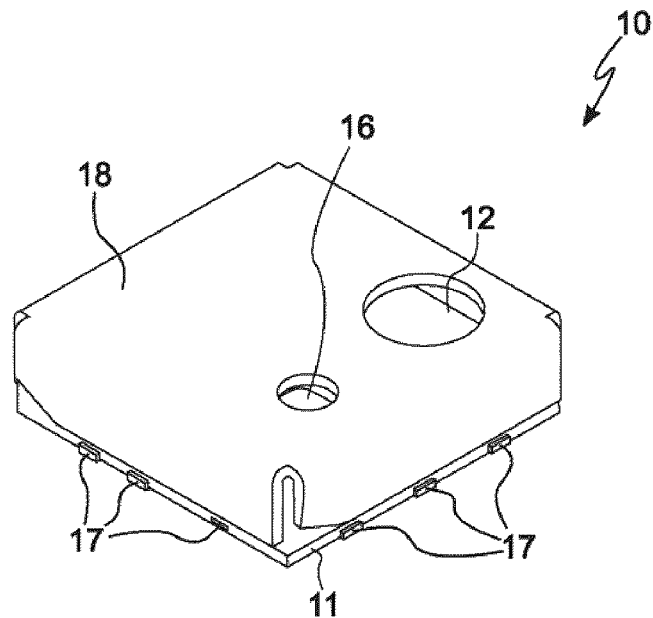
FIG. 2 shows a prior art optical proximity sensor with a metal shield or housing.
Figure 3:
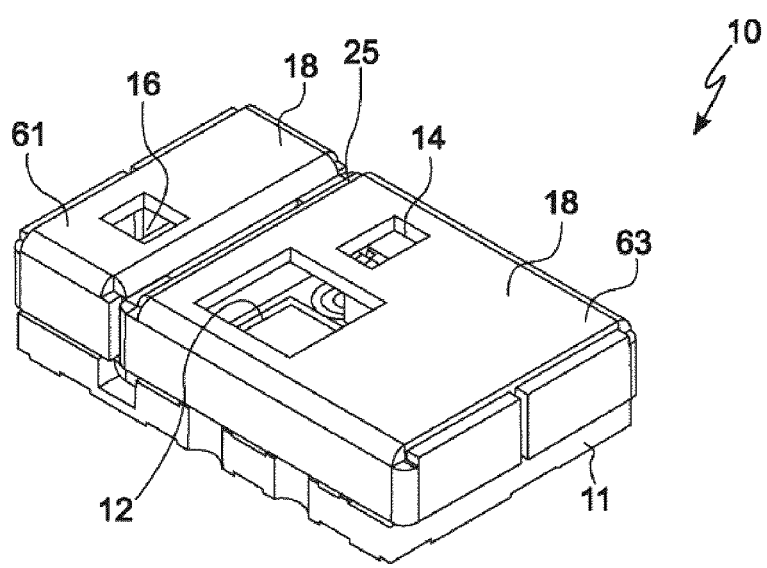
FIG. 3 shows a prior art optical proximity sensor with a more complicated metal shield or housing than that shown in FIG. 2.
Figure 4:
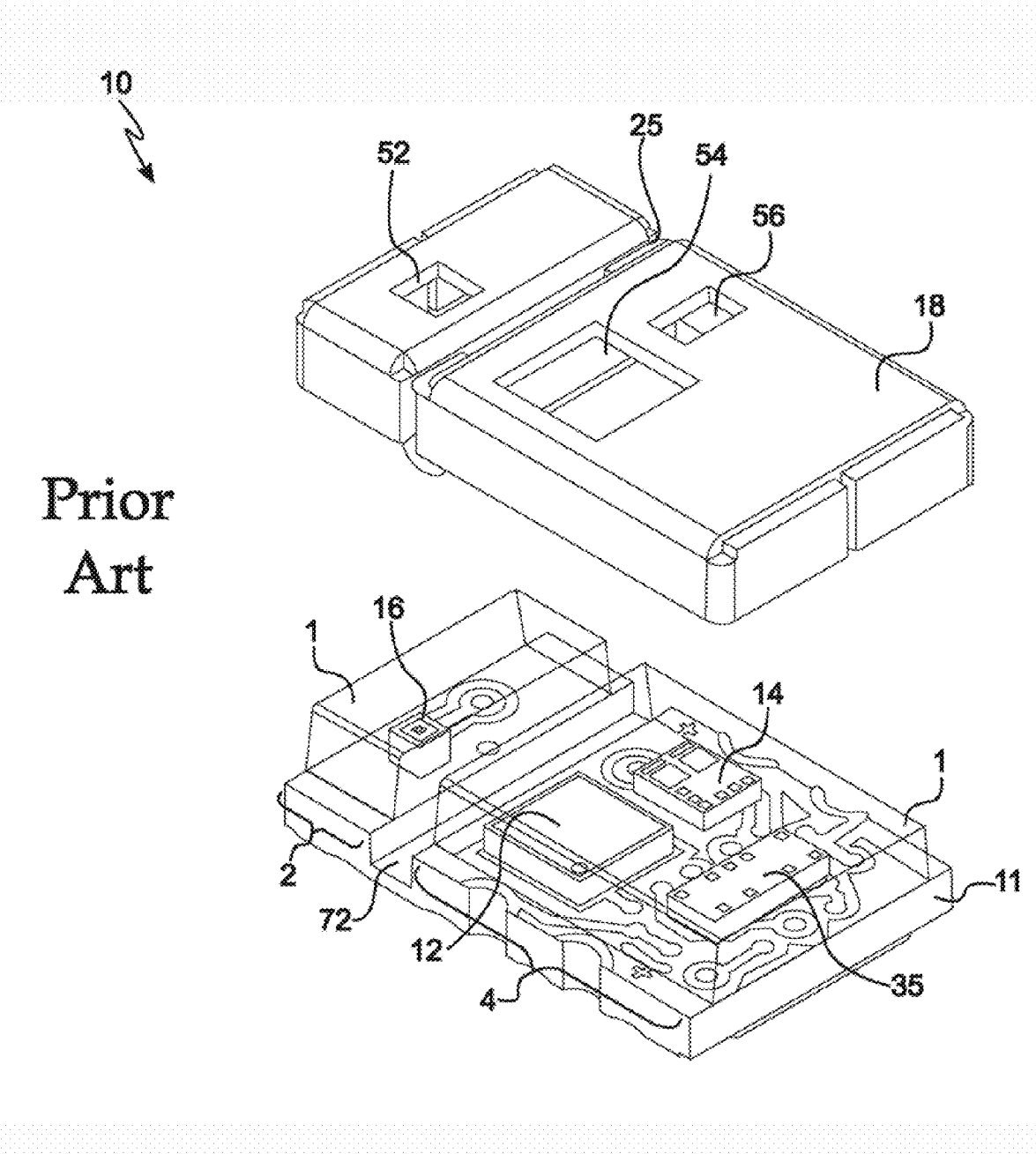
FIG. 4 shows another prior art optical proximity sensor with a metal shield or housing.

Referring to FIG. 4, there is shown a conventional optical proximity sensor known in the prior art which comprises substrate 11 and metal shield 18. Integrated circuit 35, ambient light detector 14, infrared light detector 12 and infrared light emitter 16 are mounted on substrate 11. Optically transmissive molding material 1 is molded over integrated circuit 35, ambient light detector 14, infrared light detector 12 and infrared light emitter 16. Slot 72 separates first portion of substrate 11 from second portion of substrate 11. When metal shield 18 is placed over and attached to the lower assembly containing substrate 11, integrated circuit 35, ambient light detector 14, infrared light detector 12 and infrared light emitter 16, barrier 25 fits within slot 72 and inhibits the transmission of light originating from infrared light emitter 16 from reaching infrared light detector 12. Optical proximity sensor 10 shown in FIG. 4 suffers form many of the problems and drawbacks discussed above in connection with the prior art devices shown in FIGS. 1 through 3.

Figure 5:
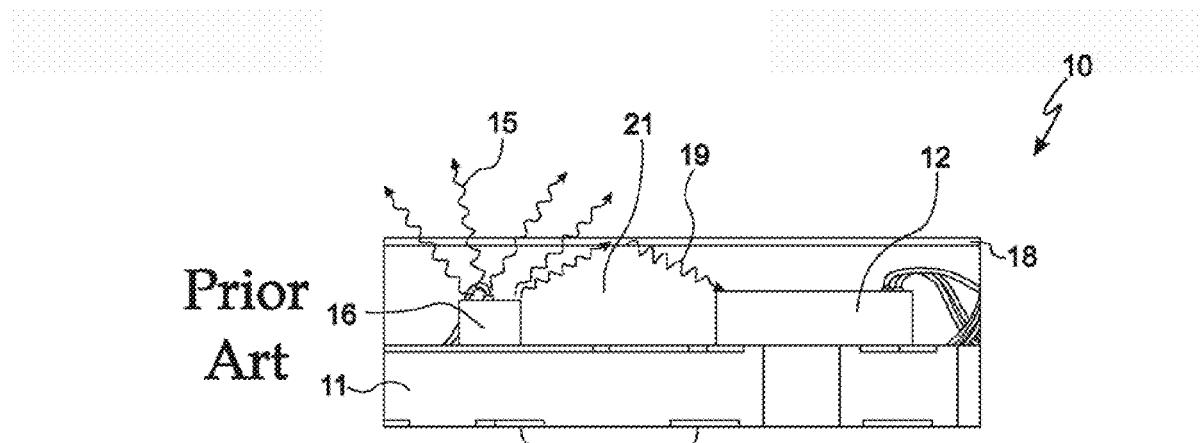
FIG. 5 shows an optical proximity sensor comprising a light emitter mounted on a substrate and separated from a light detector by an optically transmissive material.

FIG. 5 shows an optical proximity sensor 10 comprising light emitter 16 mounted on substrate 11 and separated from light detector 12 by optically transmissive material 21, which is a single mold two-part epoxy or transfer molding compound. As shown in FIG. 4, while light rays 15 are transmitted through material 21, other reflected, diffracted or refracted IR radiation 19 can leak across to light detector 12 through single mold compound 21, which manifests itself as undesired crosstalk or interference between light emitter 16 and light detector 12, thereby degrading the performance of proximity sensor 10.

Figure 6:
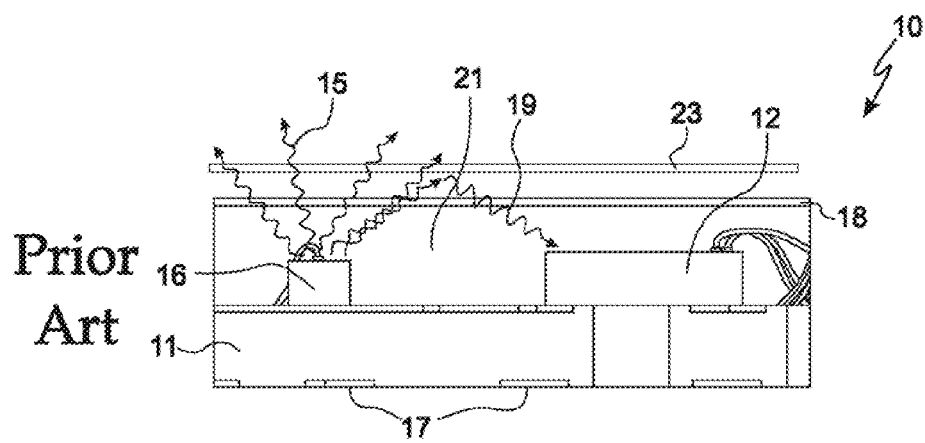
FIG. 6 shows an optical proximity sensor comprising a light emitter mounted on a substrate and separated from a light detector by an optically transmissive material, and a window disposed above the optical proximity sensor.

As further shown in FIG. 6, the amount of reflected, diffracted or refracted IR radiation 19 and undesired crosstalk or interference between light emitter 16 and light detector 12 is typically exacerbated by the presence of window 23, which in some applications is provided as part of the portable or other type of electronic device in which proximity sensor 10 is housed and mounted.

Figure 7:
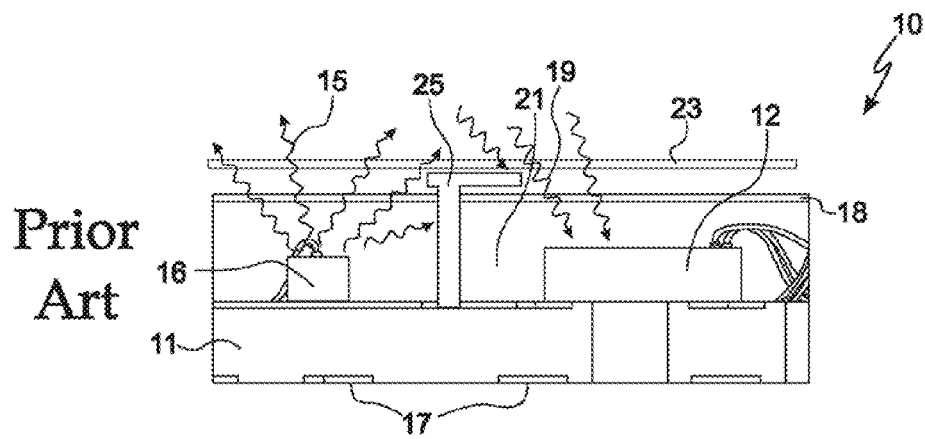
FIG. 7 shows an optical proximity sensor comprising a light emitter mounted on a substrate and separated from a light detector by a metal light barrier.

As shown in FIG. 7, the problems arising from undesired crosstalk or interference caused by reflected, diffracted or refracted IR radiation 19 may be reduced by disposing a metal light barrier 25 between light emitter 16 and light detector 12. Providing such a metal barrier 25 in proximity sensor 10, however, presents problems respecting increased manufacturing costs and complexity.

Figure 9:
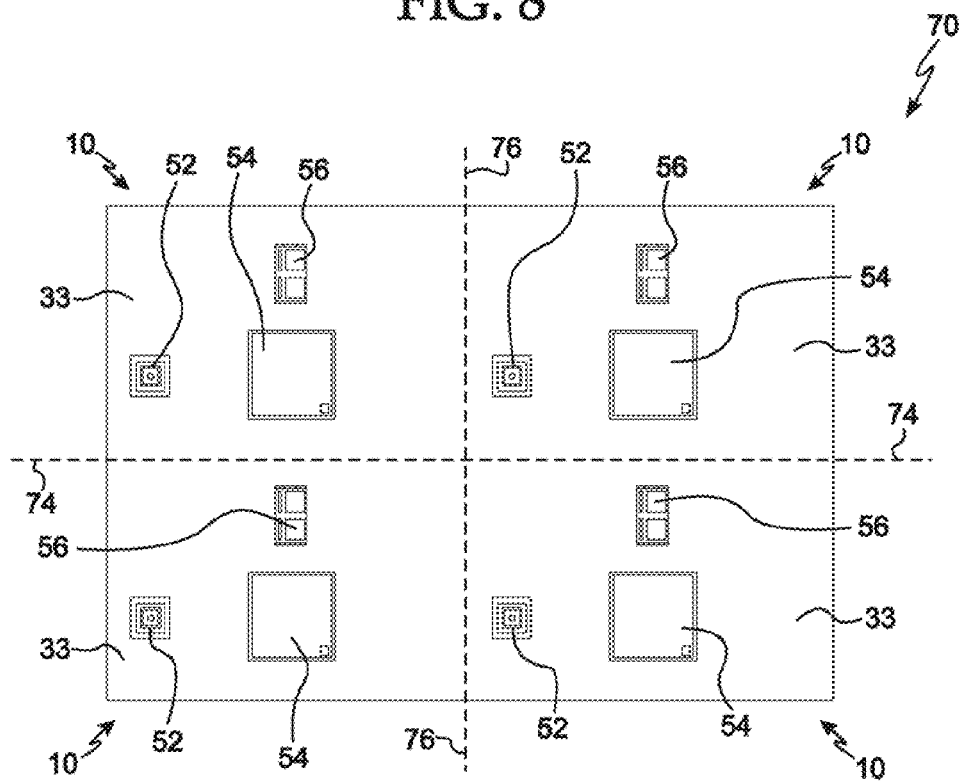
FIG. 9 shows a top plan view of the printed circuit board panel of FIG. 8 with an infrared cut component disposed thereover.
Figure 10:
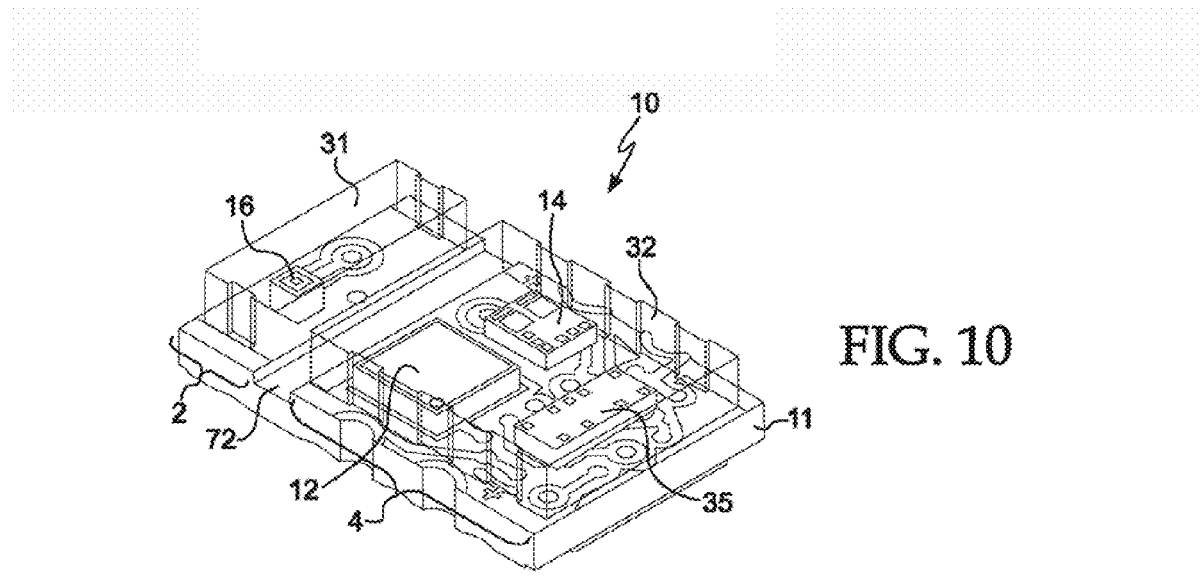
FIG. 10 shows a top perspective view of a singulated optical proximity sensor taken from the printed circuit board panel of FIG. 8 before the infrared cut component has been disposed thereover.
Figure 11:
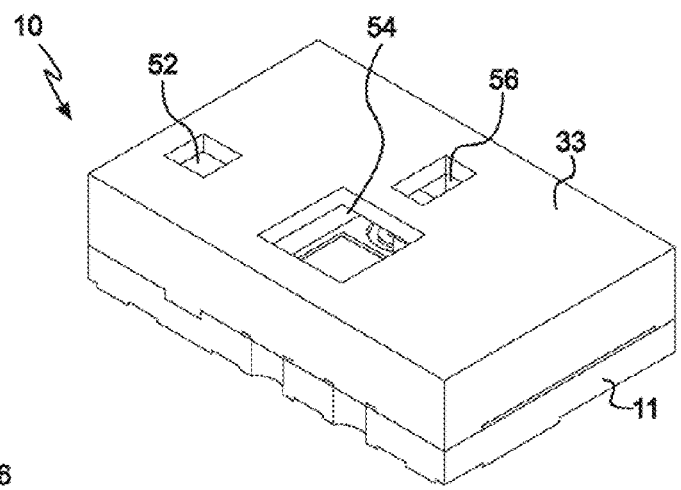
FIG. 11 shows a top perspective view of a singulated optical proximity sensor taken from the printed circuit board panel of FIG. 9 after the infrared cut component has been disposed thereover.
Figure 12:
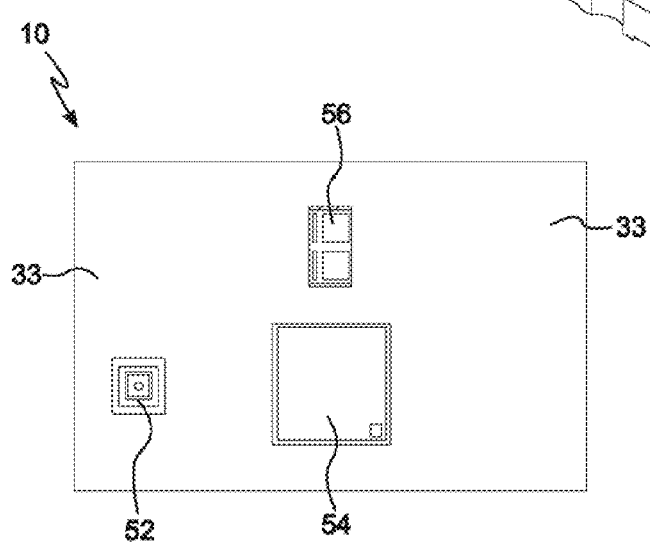
FIG. 12 shows a top plan view of the optical proximity sensor of FIG. 11.

Referring now to FIGS. 8 through 12, there are is shown one embodiment of optical proximity sensor 10 and its various components during various stages of assembly. The complete optical proximity sensor of such an embodiment is shown in FIGS. 11 and 12. As will become apparent, the embodiment of optical proximity sensor 10 shown in FIGS.

11 and 12 overcomes many of the problems associated with prior art optical proximity sensors by completely eliminating the need for a metal shield, reducing the overall size, volume and footprint of optical proximity sensor 10, and reducing manufacturing and material costs associated therewith. Many other advantages of the embodiment of the optical proximity sensor 10 illustrated in FIGS. 8 though 12 will become apparent to those skilled in the art upon having read, understood and considered the present specification and drawings.

Figure 8:
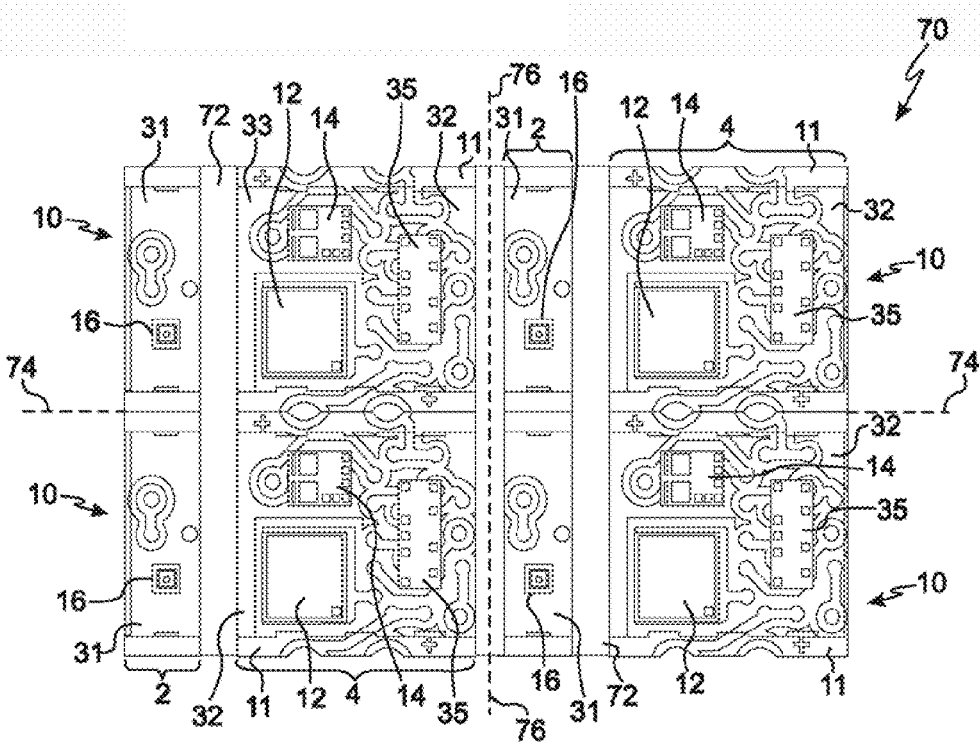
FIG. 8 shows a top plan view of a printed circuit board panel with a plurality of infrared light emitters, infrared light detectors, ambient light detectors, and integrated circuits mounted thereon and overmolded with an infrared pass component.

Referring now to FIG. 8, there is shown a printed circuit board ("PCB") panel 70 comprising a plurality of optical proximity sensors before singulation or sawing along lines 74 and 76 has been carried out, and before the second molding step employing an infrared cut molding component, compound or material has been disposed over panel 70. As shown in FIG. 8, each optical proximity sensor 10 comprises infrared light emitter 16 mounted atop first portion 2 of PCB substrate 11, infrared light detector 12, ambient light detector 14, and integrated circuit 35 mounted atop second portion 4 of PCB substrate 11. In a first molding step, which in a preferred embodiment is a transfer molding process, infrared light pass component 31 is molded over infrared light emitter 16, infrared light detector 12, ambient light detector 14, integrated circuit 35, and portions of PCB substrate 11. Next, infrared light pass component 31 is cured. Slots 72 shown in FIG. 8 are then cut or sawed through infrared light pass component 31 between first portion 2 and second portion 4 of substrate 11. FIG. 10 shows a single optical proximity sensor 10 having all the features described above with respect to optical proximity sensors 10 disposed on PCB panel 70.

Referring now to FIG. 9, in a second molding step, infrared light cut component, compound or material 33 is emplaced, preferably using transfer molding means, over slots 72, integrated circuits 35, ambient light detectors 14, and portions of infrared light emitters 16 and infrared light detectors 12 such that first, second and third apertures 52, 54 and 56 are formed over infrared light emitters 16, ambient light detectors 14, and infrared light detectors 12, respectively. Infrared light cut component, compound or material 33 is then cured. Infrared light cut component 33 is configured to permit a first portion of light emitted by light emitter 16 to pass through infrared light pass component 31 and first aperture 52 such that at least a second portion of the first portion of light reflected from an object of interest in proximity to sensor 10 passes through second aperture 54 and infrared light pass component 31 for detection by infrared light detector 12. Infrared light cut component 33 is further configured to be disposed between infrared light emitter 16 and infrared light detector 12 in each of devices 10 so as to substantially attenuate or block the transmission of undesired direct, scattered or reflected light between infrared light emitter 16 and infrared light detector 12 and thereby minimize optical crosstalk and interference between infrared light emitter 16 and infrared light detector 12. Next, optical proximity sensors 10 are singulated and separated from one another to form individual proximity sensors 10 such as that illustrated in FIGS. 11 and 12.

According to one embodiment, light emitter 16 is a semiconductor infrared LED such as a Model No. TK116IRA TYNTEK™ AlGaAs/GaAs Infrared Chip, the data sheet for which is included in an Information Disclosure Statement filed on even date herewith and the entirety of which is hereby incorporated by reference herein. Light detector 12 may be, by way of example, a TYNTEK™ Si Photo-diode Chip No, TK 043PD, the data sheet for which is hereby incorporated by reference herein in its entirety. Ambient light detector 14 may be, by way of example, an AVAGO TECHNOLOGIES™ APDS-9005 Miniature Surface-Mount Ambient Light Photo Sensor, the data sheet for which is hereby incorporated by reference herein in its entirety. Integrated circuit 35 may be, by way of example, an AVAGO TECHNOLOGIES™ APDS-9700 signal conditioning IC for optical proximity sensors, the data sheet for which is hereby incorporated by reference herein in its entirety.

Note that in one embodiment substrate 11 is a printed circuit board having traces, wire bond pads and/or vias disposed thereon or therein. Conventional materials well known to those skilled in the art may be employed to form substrate 11, including flex material and ceramic. Note further that infrared light pass component 31 may be shaped to include lenses over infrared light emitter 16, infrared light detector 12, and ambient light detector 14 to increase the efficiency of light transmission therefrom or light reception thereby.

Infrared light cut component 33 does not extend over apertures 52, 54 and 56, which are configured to permit the passage of direct, reflected and ambient light therethrough, respectively. Infrared light cut component 33 does extend and is molded between first portion 2 and second portion 4 of substrate 11 and within slot 72 so as to attenuate or absorb undesired scattered, reflected or direct light rays that might otherwise propagate between light emitter 16 and light detectors 12 and 14. That is, infrared light cut component 33 is configured and molded to substantially attenuate or block the transmission of undesired direct, scattered or reflected light between light emitter 16 and light detector 12, and thereby minimize optical crosstalk and interference between light emitter 16 and light detector 12. Infrared light emitter 16 is operably connected to integrated circuit 35 and is driven by a light emitter driving circuit contained therein. Similarly, light detector 12 is operably connected to integrated circuit 35, which comprises a light detector circuit incorporated therein. Ambient light detector or sensor 14 is also operably connected to integrated circuit 35, which contains an ambient light sensing circuit incorporated therein.

Infra-red rays emitted by light emitter or LED 16 exit sensor 10 and return to light detector 12 as rays, thereby permitting detection of the nearby object that is to be detected. Light rays reflected from the surface of molded component 31 are blocked from reaching light detector 12 by molded substantially optically non-transmissive infrared light cut component 33. Light rays reflected from a window interposed between optical sensor 10 and object to be detected 60 are also blocked by molded substantially optically non-transmissive infrared light cut component 33. Total Internal Reflection between components 31 and 33 helps improve the performance of proximity sensor 10. As will now be seen, the embodiment of sensor 10 shown in FIGS. 8 through 12 eliminates the need to provide a metal shield, while improving the optical performance of sensor 10 by reducing crosstalk and interference, as undesired reflected, refracted or diffracted light rays cannot penetrate and travel through to light detectors 12 or 14.

According to one embodiment, molded optically transmissive infrared light pass component, compound or material is formed using an infrared-pass and optically transmissive transfer molding compound such as NITTO DENKO™ NT-8506 clear transfer molding compound 8506 or PENCHEM Technologies™ OP 579 infrared pass optoelectronic epoxy. Other suitable optically transmissive epoxies, plastics, polymers or other materials may also be employed. See Technical Data Sheet NT-8506 entitled "Clear Transfer Molding Compound NT-8506" dated 2001 and PENCHEM OP 579 IR Pass Optoelectronic Epoxy Data Sheet, Revision 1, dated April, 2009, both of which documents are hereby incorporated by reference herein, each in its respective entirety.

In one embodiment, molded substantially optically non-transmissive infrared light cut component 33 is formed using an infrared-blocking, filtering or cutting transfer molding compound such as NITTO DENKO™ NT-MB-IRL3801 two-part epoxy resin material or PENCHEM Technologies™ OP 580 infrared filter optoelectronic epoxy, either of which preferably contains an amount of an infrared cutting material that has been selected by the user to achieve acceptable infrared light blocking performance while minimizing the amount of such infrared cutting material employed to keep costs to a minimum. Other suitable optically non-transmissive epoxies, plastics, polymers or other materials may also be employed. See Technical Data Sheet NT-MB-IRL3801 published by DENKO™ dated 2008 and PENCHEM OP 580 IR Filter Optoelectronic Epoxy Data Sheet, Revision 1, dated April, 2009, both of which documents are hereby incorporated by reference herein, each in its respective entirety.

Figure 13:
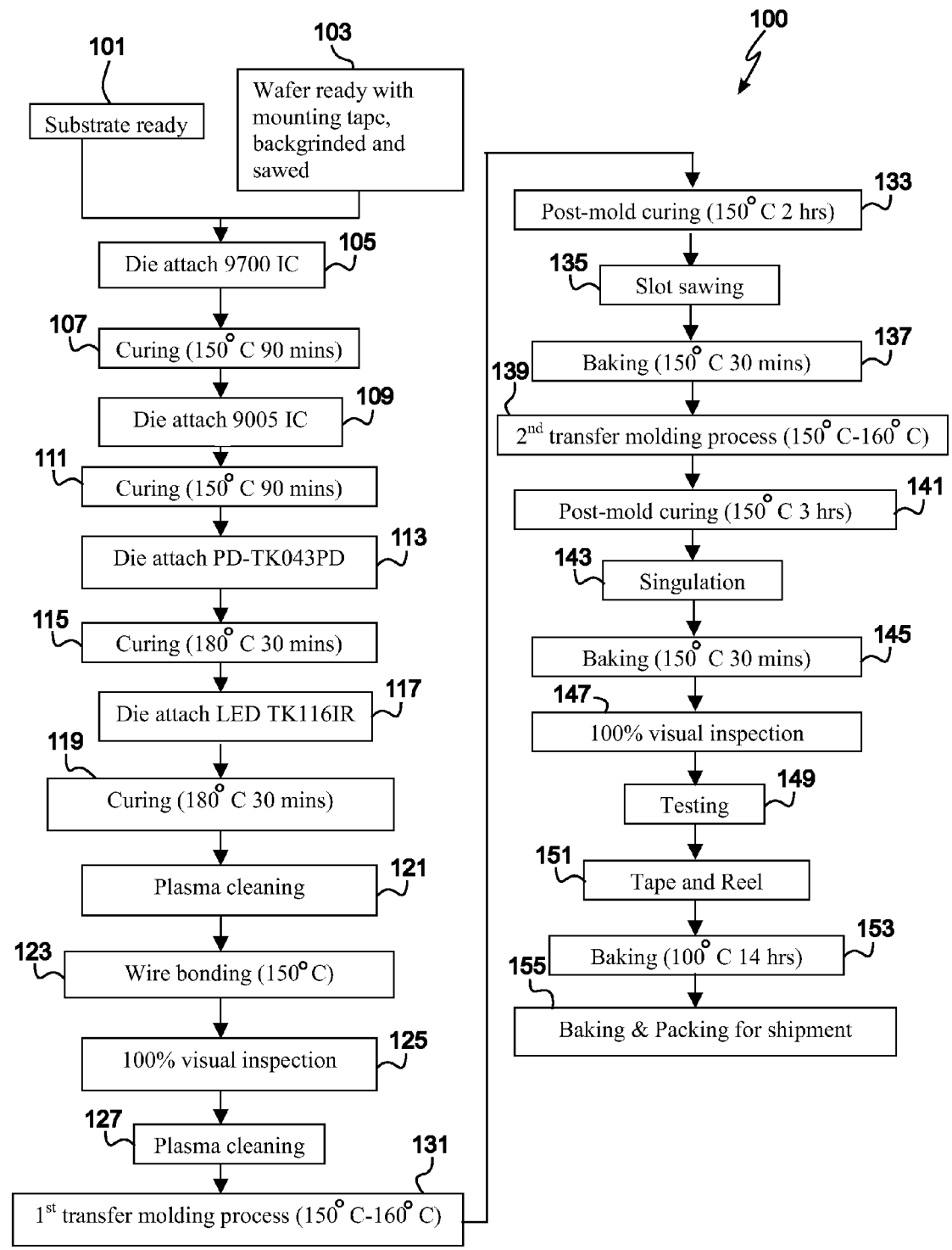
FIG. 13 illustrates one embodiment of a method of the invention.
Figure 14:
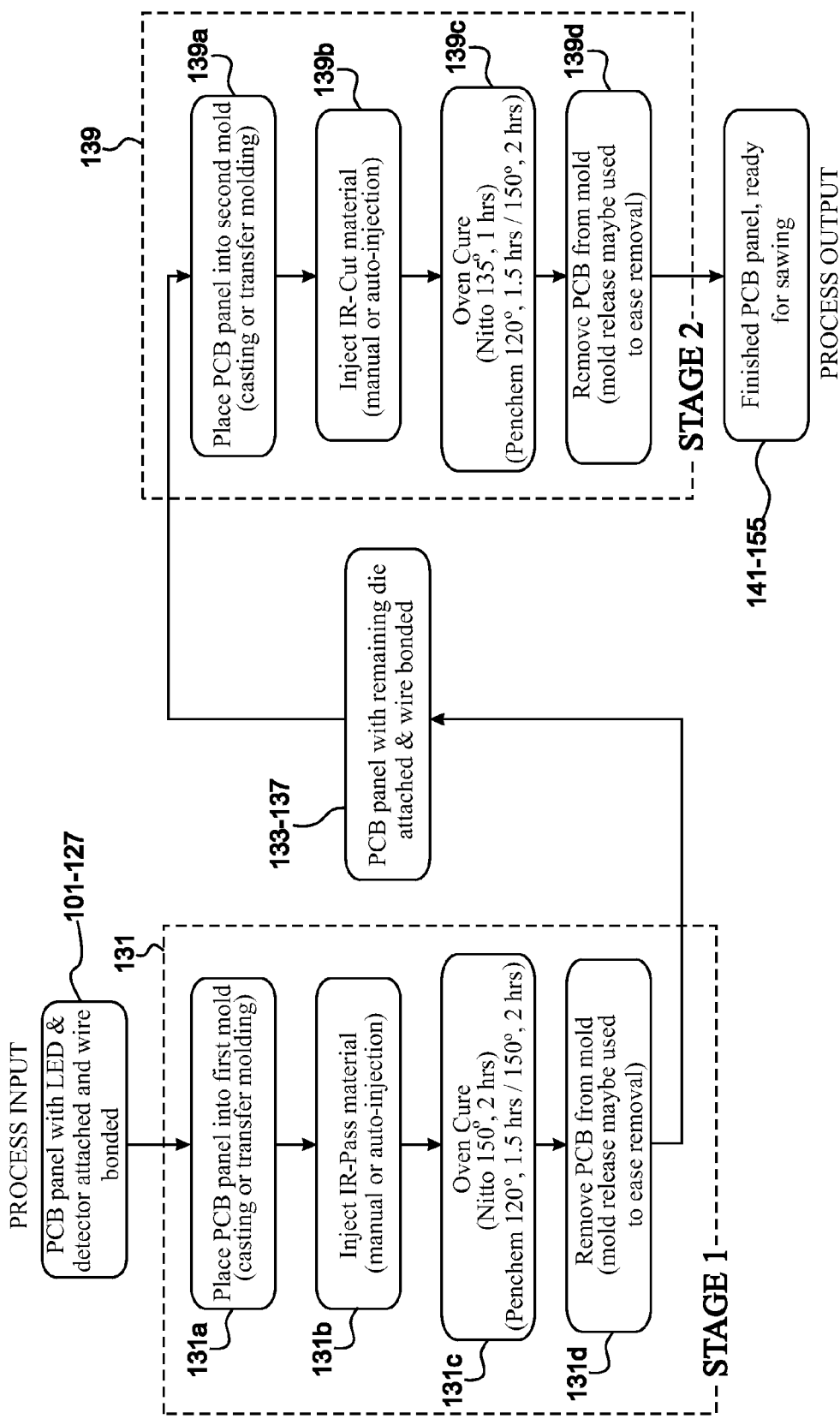
FIG. 14 illustrates sub-steps associated with the first and second transfer molding processes shown in FIG. 13 according to one embodiment thereof.

Referring now to FIGS. 13 and 14, there are shown steps corresponding to one embodiment of method 100 for making an optical proximity sensor. As shown in FIG. 13, the assembly process begins at steps 101 and 103 by providing substrate 11 (preferably in the form of PCB panel 70 described above) and the various ICs that are to be employed in method 100 (e.g., wafers for 9700 ICs, 9005 ICs, TK116IR ICs, and TK043 ICs). All wafers are preferably mounted on blue mounting tape, backgrinded and diced. In the first pass die attachment process at step 105, integrated circuits 35 (e.g., 9700 ICs) are attached to substrates 11 using an electrically non-conductive epoxy such as ABLESTK™ 2025, which is then cured at step 107 at 150 C for 90 minutes. In the second die attachment process at step 109, ambient light detectors 14 (e.g., 9005 ICs) are attached to substrates 11 using an electrically non-conductive epoxy such as ABLESTK™ 2025, which is then cured at step 111 at 150 C for 90 minutes. In the third die attachment process at step 113, infrared light detectors 12 (e.g., PD-TK043PD ICs) are attached to substrates 11 using an electrically conductive epoxy such as conductive epoxy such as FDP5053 or FDP5100, which is then cured at step 115 at 180 C for 30 minutes. In the fourth die attachment process at step 117, infrared light emitters 16 (e.g., LED TK116IR ICs) are attached to substrates 11 using an electrically conductive epoxy such as conductive epoxy such as FDP5053 or FDP5100, which is then cured at step 119 at 180 C for 30 minutes. Next, at step 121 plasma cleaning is conducted to clean the surfaces of substrates 11, and especially the wire bonding surfaces thereof. Wire bonding is then conducted at step 123 at a bonding temperature of 150 C. After wire bonding, 100% visual inspection is conducted at step 125 to verify the integrity and robustness the connections established by wire bonding. After visual inspection at step 125, a second plasma cleaning step 127 is conducted. First transfer molding process 131 is carried out using an optically transmissive compound such as NT8506 at a molding temperature ranging between about 150 C and about 160 C. At step 133 post-mold curing is carried out at 150 C for about 2 hours. After curing mold compound 31, slots 72 are sawed therethrough, followed by baking at 150 C for about 30 minutes. Second transfer molding process 139 is next conducted using a black infrared cut compound such as NT8570 at a molding temperature ranging between about 150 C and about 160 C, followed by post-molding curing at step 141 at about 150 C for about 3 hours. After curing, singulation is conducted at step 143 to cut PCB panel 72 into individual units, which are then baked at step 145 at about 150 C for about 30 minutes. One hundred percent visual inspection of sensors 10 is conducted at step 147, followed by final electrical testing at step 149. After testing, sensor 10 which have passed inspection and testing are packed onto a tape and reel at step 151 for baking at step 153 at 100 C for about 14 hours before being packed for shipment at step 155.

Referring now to FIG. 14, there are shown details of sub-steps that occur within first transfer molding process 131 and second transfer molding process 139.

Those skilled in the art will understand that many different variations in, and permutations or combinations of, the steps disclosed above can be made without departing from the scope of the invention such as by, for example, modifying steps, changing the order of steps, omitting steps, adding steps, and so on.

The transfer molding processes described above include methods where thermosetting materials are softened by heat and pressure in a transfer chamber, and then forced at high pressure through suitable sprues, runners, and gates into a closed mold for final curing.

Included within the scope of the present invention are methods of making and having made the various components, devices and systems described herein.

Those skilled in the art will understand that the various embodiments of the proximity sensor disclosed herein may be incorporated into portable electronic devices such as mobile telephones, smart phones, personal data assistants (PDAs), laptop computers, notebook computer, computers and other devices.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A method of making an optical proximity sensor, comprising:
   mounting an infrared light emitter atop a first portion of a substrate;
   mounting an infrared light detector, an ambient light detector, and an integrated circuit atop a second portion of the substrate;
   in a first molding step, molding an infrared light pass component over the infrared light emitter, the infrared light detector, the ambient light detector, the integrated circuit, and portions of the substrate;
   curing the infrared light pass component to form a single molded volume in contact with the infrared light emitter, the infrared light detector, the ambient light detector, the integrated circuit, and portions of the substrate;
   forming a slot in the single molded volume of cured infrared light pass component between the first and second portions of the substrate; and
   in a second molding step after the first step and after the slot has been formed, molding an infrared light cut component over the slot and the integrated circuit, and over portions of the infrared light emitter, the ambient light detector, and the infrared light detector such that first, second and third apertures are formed over the infrared light emitter, the ambient light detector, and the infrared light detector, respectively; and such that the infrared light cut component fills the slot.

2. The method of claim 1, further comprising molding the infrared light cut component to permit a first portion of light emitted by the light emitter to pass through the infrared light pass component and the first aperture, and at least a second portion of the first portion of light reflected from an object of interest in proximity to the sensor to pass through the second aperture and the infrared light pass component for detection by the infrared light detector.

3. The method of claim 1, wherein the infrared light cut component is disposed between the infrared light emitter and the infrared light detector and is configured to substantially attenuate or block the transmission of undesired direct, scattered or reflected light between the infrared light emitter and the infrared light detector and thereby minimize optical crosstalk and interference between the infrared light emitter and the infrared light detector.

4. The method of claim 1, wherein the infrared light pass component is molded to completely cover the infrared light emitter, the infrared light detector, the ambient light detector, and the integrated circuit.

5. The method of claim 1, wherein the integrated circuit comprises light emitter driving and light detecting circuits.

6. The method of claim 1, wherein the substrate comprises a plurality of wire bond pads, and wire bond electrical connections are established between the substrate and the infrared light emitter, the infrared light detector, and the ambient light detector, respectively, before the first transfer molding step.

7. The method of claim 1, wherein optically transmissive lenses are formed over the infrared light emitter and the infrared light detector when the infrared light pass component is transfer molded.

8. The method of claim 1, wherein at least one of the infrared light emitter, the infrared light detector, the ambient light detector and the integrated circuit is die-attached to the substrate.

9. The method of claim 1, wherein the first molding step is carried out using transfer molding.

10. The method of claim 1, wherein the second molding step is carried out using transfer molding.

11. The method of claim 1, wherein forming the slot is carried out by cutting.

12. The method of claim 1, wherein forming the slot is carried out by sawing.

13. The method of claim 1, wherein the infrared light pass component comprises an optically transmissive epoxy, polymer or plastic.

14. The method of claim 1, wherein the infrared light cut component comprises a substantially optically non-transmissive moldable material, epoxy, polymer or plastic.

15. The method of claim 1, wherein the infrared light cut component further comprises an infrared cut or blocking additive.

16. The method of claim 1, wherein the substrate is a printed circuit board ("PCB").

17. The method of claim 1, wherein the integrated circuit is an application specific integrated circuit ("ASIC").

18. The method of claim 1, further comprising operably incorporating the optical proximity sensor into a portable electronic device.

19. The method of claim 15, wherein the portable electronic device is a mobile telephone, a personal data assistant (PDA), a laptop computer, a notebook computer, or a computer.

20. The method of claim 1, wherein the infrared light emitter is an LED.

21. The method of claim 1, wherein the infrared light detector is a positive-intrinsic-negative ("PIN") diode.

22. An optical proximity sensor, comprising:
an infrared light emitter mounted atop a first portion of a substrate;
an infrared light detector, an ambient light detector, and an integrated circuit mounted atop a second portion of the substrate;
an infrared light pass component molded over the infrared light emitter, the infrared light detector, the ambient light detector, the integrated circuit, and at least portions of the substrate;
a slot disposed in the cured infrared light pass component between the first and second portions of the substrate, and
an infrared light cut component molded over the slot and the integrated circuit, and over portions of the infrared light emitter, the ambient light detector, and the infrared light detector, such that first, second and third apertures are formed over the infrared light emitter, the ambient light detector, and the infrared light detector, respectively; and such that the infrared light cut component fills the slot.

23. The optical proximity sensor of claim 22, wherein the infrared light cut component is molded to permit a first portion of light emitted by the light detector to pass through the infrared light pass component and the first aperture, and at least a second portion of the first portion of light reflected from an object of interest in proximity to the sensor to pass through the second aperture and the infrared light pass component for detection by the infrared light detector.

24. The optical proximity sensor of claim 22, wherein the infrared light cut component is disposed between the infrared light emitter and the infrared light detector and is configured to substantially attenuate or block the transmission of undesired direct, scattered or reflected light between the infrared light emitter and the infrared light detector and thereby minimize optical crosstalk and interference between the infrared light emitter and the infrared light detector.

25. The optical proximity sensor of claim 22, wherein the infrared light pass component is molded to completely cover the infrared light emitter, the infrared light detector, the ambient light detector, and the integrated circuit.

26. The optical proximity sensor of claim 22, wherein the integrated circuit comprises light emitter driving and light detecting circuits.

27. The optical proximity sensor of claim 22, wherein the infrared light pass component comprises an optically transmissive epoxy, polymer or plastic.

28. The optical proximity sensor of claim 22, wherein the infrared light cut component comprises a substantially optically non-transmissive moldable material, epoxy, polymer or plastic.

29. The optical proximity sensor of claim 22, wherein the infrared light cut component further comprises an infrared cut or blocking additive.

30. The optical proximity sensor of claim 22, wherein the substrate is a printed circuit board ("PCB").

31. The optical proximity sensor of claim 22, further comprising a portable electronic device into which the optical proximity sensor is incorporated.

32. The proximity sensor of claim 31, wherein the portable electronic device is a mobile telephone, a personal data assistant (PDA), a laptop computer, a notebook computer, or a computer.

* * * * *